United States Patent Office 3,495,010
Patented Feb. 10, 1970

3,495,010
METHOD OF EFFECTING FECAL SOFTENING
Spencer M. Fossel, Bernardsville, N.J., assignor to Unimed, Inc., Morristown, N.J.
No Drawing. Continuation-in-part of application Ser. No. 659,336, Aug. 9, 1967. This application Oct. 14, 1968, Ser. No. 767,504
Int. Cl. A61k 27/00
U.S. Cl. 424—312         6 Claims

ABSTRACT OF THE DISCLOSURE

The present invention relates to a method of achieving fecal softening in human beings an animals, according to which there is administered, preferably orally, polyglycerols, polyglycerol esters and the like. These compounds when administered in accordance with this invention achieve a high degree of fecal softening with a high degree of effectiveness and with a complete lack of toxicity.

CROSS REFERENCE TO RELATED APPLICATIONS

This application is a continuation in part of my pending application Ser. No. 659,336, filed Aug. 9, 1967, for "Treatment of Constipation" which in turn is a divisional of applications Ser. No. 646,649 filed June 16, 1967 and Ser. No. 496,170, filed Oct. 14, 1965, for "Treatment of Epilepsy, Glaucoma and Constipation," which in turn is a continuation-in-part of application Ser. No. 405,829, filed Oct. 22, 1964, for "Treatment of Epilepsy and Glaucoma," all now abandoned.

BACKGROUND OF THE INVENTION

One of the best known fecal softeners is mineral oil. While this substance provides a good degree of fecal softening with a high degree of safety, it suffers from the considerable disadvantage that many people cannot take it because it may cause nausea and the like. It is therefore desirable to find a means of achieving satisfactory fecal softening with an easy to take substance.

SUMMARY OF THE INVENTION

Generally speaking this invention relates to achieving a mineral oil-like fecal softening action by the administration to a patient, preferably a human being, requiring the same, of an effective amount of either a polyglycerol or a polyglycerol ester, or a polyethylene glycol wherein the "poly" is at least "tri," or a polypropylene glycol wherein the "poly" is at least "tri," in all cases the molecular weight being up to 12,000.

Although the invention is applicable to the use of either a polyglycerol or polyglycerol ester or a polyethylene glycol, or a polypropylene glycol, the preferred substances for the purposes of the invention are the polyglycerols and the polyglycerol esters, most preferably decaglycerol monopalmitate.

The use of the polyglycerols and polyglycerol esters for the purposes of the present invention provide numerous advantages. Aside from the advantages in effectivity, which will be further discussed below, one of the primary advantages of these compounds is that the body is able to utilize the polyglycerols and polyglycerol esters just like common fats and oils so that there is no accumulation or toxic effect whatsoever even upon extensive and high dosage use of the substances. As a matter of fact, these substances are so safe that the Food and Drug Administration has approved use of these substances in foods.

I have discovered, however, that these substances, in addition to the safety which permits their use as and in foods, have marked effectiveness for fecal softening purposes.

An advantage of the present invention is that it is possible by adjusting the degree of esterification of the polyglycerols to adjust the speed of the relief in the body so that it is possible to provide either quick acting compositions, slow acting compositions, or compositions which both act quickly and over a prolonged period of time.

It is possible in accordance with the present invention to use the polyglycerols and polyglycerol esters and other substances as a substitute for mineral oil for fecal softening purposes, particularly for older people. These substances provide effective relief.

While glycerin itself might have some suitability for such uses, the compounds of the present invention provide several advantages, in addition to greater effectiveness, over glycerin. One of the advantages is that glycerin cannot be taken as freely as the polyglycerols and polyglycerol esters of the present invention, because prolonged and extensive administration of glycerin can cause gastric and other upsets. Furthermore, glycerin is highly unpalatable and is difficult to take in concentrated form. The polyglycerols and polyglycerol esters of the present invention, on the other hand, can easily be taken in concentrated form. In fact, those polyglycerols and polyglycerol esters can be taken in the form of capsules for the viscous liquid polyglycerols and polyglycerol esters, and in capsule or tablet form for the solid, powdered polyglycerols and polyglycerol esters.

Among the most suitable polyglycerols and polyglycerol esters for purposes of the present invention are: Triglycerol, hexaglycerol, decaglycerol, triglycerol monostearate, triglycerol monooleate, hexaglycerol monostearate, hexaglycerol monooleate, hexaglycerol dioleate, hexaglycerol hexaoleate, decaglycerol monostearate, decaglycerol monooleate, decaglycerol monolaurate, decaglycerol tristearate decaglycerol trioleate decaglycerol trilinoleate, decaglycerol decastearate, decaglycerol decaoleate, decaglycerol decalinoleate, triglycerol mono shortening ("Drewpol 3–1–SH"), hexaglycerol mono shortening ("Drewpol 6–1–SH"), hexaglycerol di shortening ("Drewpol 6–2–SH"), decaglycerol mono shortening ("Drewpol 10–1–SH"), decaglycerol tri shortening ("Drewpol 10–3–SH"), diglycerol, tetraglycerol, pentaglycerol, hexaglycerol, heptaglycerol, octaglycerol, monaglycerol, pentaglycerol monostearate, triglycerol mono cottonseed, pentaglycerol mono cottonseed, triglycerol mono hydrogenated cottonseed, pentaglycerol mono hydrogenated cottonseed.

The preferred glycerols and glycerol esters for the purpose of the present invention are triglycerol, decaglycerol, hexaglycerol, triglycerol monostearate, hexaglycerol distearate, decaglycerol tetraoleate, and decaglycerol tristearate. The most preferred substances are decaglycerol, decaglycerol monopalmitate and decaglycerol tetralinoleate.

It can be seen, however, from the above list, that the invention is applicable to all of the polyglycerols and particularly the polyglycerols from diglycerol to decaglycerol and partial and complete esters thereof with $C_2$ to $C_{24}$ fatty acids which are either saturated, monounsaturated or poly-unsaturated.

The dosage of the polyglycerols and polyglycerol esters of the present invention in order to effect fecal softening will vary depending upon the molecular weight of the particular polyglycerol or polyglycerol esters as well as upon the number of hydroxyl groups thereof. A typical dosage is about 20–50 grams, which can be administered three to four times a day. It is generally desirable to administer about 40–50 grams prior to going to bed. Higher amounts can also be administered. As mentioned above, the advantage of polyglycerols and polyglycerol esters of the present invention is their complete lack of toxicity.

The lower glycols such as ethylene glycol and diethylene glycol are readily metabolized to or readily contribute to undesired concentrations of oxalate ions, and therefore, these substances have not found acceptance for human consumption. However, the triethylene glycol and higher ethylene glycols act similarly to the polyglycerols and can be suitably used for the purposes of the present invention.

As a practical matter, the polyethylene glycols, and likewise the polypropylene glycols should not be used beyond a molecular weight of about 12,000. This higher molecular weight limitation is mainly a practical limitation because the higher polymers tend to become less and less water soluble or easily dispersible in physiological fluids.

The compounds of the invention are useful for the purposes of the invention whereas ordinary dietary proteins do not produce these beneficial effects. These ordinary dietary proteins include caseine and albumen, and the same are readily hydrolyzed to amino acids by proteolytic enzymes. On the other hand, the compounds of the invention are not metabolized readily by the body, they have a low antigenicity and are readily usable for the purposes of this invention.

DESCRIPTION OF PREFERRED EMBODIMENTS

The following examples are given to further illustrate the invention. The scope of the invention is not, however, meant to be limited to the specific details of these examples.

EXAMPLE 1

Large gelatin capsules are filled with 5 grams each of decaglycerol. In order to effect fecal softening, 4 capsules are administered orally to the person requiring the same prior to going to bed.

EXAMPLE 2

Gelatin capsules are filled with 5 grams each of decaglycerol monopalmitate. These capsules are used as in Example 1.

EXAMPLE 3

Large size gelatin capsules are filled with 10 grams each of decaglycerol trilinoleate. These capsules are administered in the form of 4 capsules before going to bed, in order to effect fecal softening.

EXAMPLE 4

Large gelatin capsules are filled with 5 grams each of triethylene glycol. Five capsules can be given to a person before the person goes to bed, for fecal softening purposes.

EXAMPLE 5

Gelatin capsules are filled with 5 grams each of decapropylene glycol. These capsules are administered in the form of 4 capsules before going to bed, for fecal softening.

While the invention has been described in particular with respect to effecting of fecal softening by the use of certain polyglycerols, polyglycerol esters and similar compounds, it is to be understood that variations and modifications of the invention can be made without departing from the spirit or scope thereof.

What is claimed is:

1. Method of effecting fecal softening, which comprises orally administering to a patient requiring such treatment, a fecal softening effective amount of a substance selected from the group consisting of polyglycerols from diglycerol to decaglycerol, and fatty esters thereof with $C_2$ to $C_{24}$ fatty acids.

2. Method according to claim 1 wherein said substance is decaglycerol.

3. Method according to claim 1 wherein said substance is decaglycerol monopalmitate.

4. Method according to claim 1 wherein said substance is decaglycerol trilinoleate.

5. Method according to claim 1 wherein said substance is administered orally in a dose of about 20–50 grams, three to four times a day.

6. Method according to claim 1 wherein said substance is administered orally in an amount of about 40–50 grams prior to going to bed.

References Cited

UNITED STATES PATENTS

| | | | |
|---|---|---|---|
| 2,024,356 | 12/1935 | Harris | 99—118 |
| 2,132,417 | 10/1938 | Harris | 99—123 |

ALBERT T. MEYERS, Primary Examiner

JEROME D. GOLDBERG, Assistant Examiner

U.S. Cl. X.R.

424—343